PETER PEARSON, OF LEEDS, GREAT BRITAIN.

*Letters Patent No. 87,965, dated March 16, 1869.*

IMPROVED PREPARATION OF COCOA.

*The Schedule referred to in these Letters Patent and making part of the same.*

*To all whom it may concern:*

Be it known that I, PETER PEARSON, of Leeds, county of York, Kingdom of Great Brtiain and Ireland, have invented certain Improvements in the Treatment of Cocoa; and I do hereby declare the following to be a full, clear, and exact description of the same.

My invention is designed to produce a concentrated essence or preparation of cocoa, which is vendible in a liquid or semi-liquid state, and is always ready for instant use.

The invention consists principally in combining a concentrated liquid extract, obtained from cocoa-nuts, or nibs, with a certain portion of cocoa from which the fatty matter, or "cocoa-butter," has been wholly or in part previously extracted; and, if desired, alcohol, or other preservative agent, may be added, for the purpose of preventing fermentation or other deleterious action of such liquid compound.

For example, I take one pint of strong liquid extract of cocoa-nuts or nibs, obtained by decoction, infusion, or other known means, and add thereto about one-quarter of a pound, more or less, as desired, of cocoa, from which the fatty matter has been wholly or in part previously expressed or extracted, and I then add, if desired, any suitable flavoring-matter, such as vanilla, for instance, and also a sufficient quantity of alcohol, or other suitable preservative agent.

By these means, I produce a concentrated essence or preparation of cocoa in a liquid or semi-liquid form, and which is always ready for instant use.

This preparation, so obtained, is perfectly soluble, and may be kept in bottles, or other air-tight vessels, for a great length of time without loss or deterioration.

When desired for use, take about one dessert-spoonful of the preparation to a breakfast-cupful of hot water, and add sugar and cream according to the taste, if desired, the result being a readily-made cupful of cocoa-beverage.

Having now described the nature and object of my said invention for "certain improvements in the treatment of cocoa," together with the manner in which the same is to be or may be performed, or carried into practical effect, I would remark, in conclusion, that I do not intend to limit myself to any particular way of obtaining the strong liquid extract of cocoa above referred to, nor to the use of alcohol as a preservative agent, or of any particular flavoring-matter; but

What I claim as my invention, is—

The preparation of cocoa in a fluid or semi-fluid state, by combining a concentrated liquid extract of cocoa-nuts or nibs with cocoa from which the fatty matter has been wholly or in part previously expressed or extracted, and with the addition of flavoring or other matters, if desired.

In testimony whereof, I have signed my name to this specification, in the presence of two subscribing witnesses.

PETER PEARSON.

Witnesses:
   GEORGE DAVIS, C. E.,
     *Patent Agent, Manchester.*
   JNO. HUGHES,
     *Clerk to the said George Davis.*